Feb. 14, 1933.   J. M. BAUM   1,897,416
AUTOMATIC VARIABLE SPEED DRIVE
Filed Oct. 12, 1931   3 Sheets-Sheet 1

Inventor
Jesse M. Baum
By C. A. Snow & Co.
Attorneys.

Feb. 14, 1933. J. M. BAUM 1,897,416
AUTOMATIC VARIABLE SPEED DRIVE
Filed Oct. 12, 1931 3 Sheets-Sheet 2
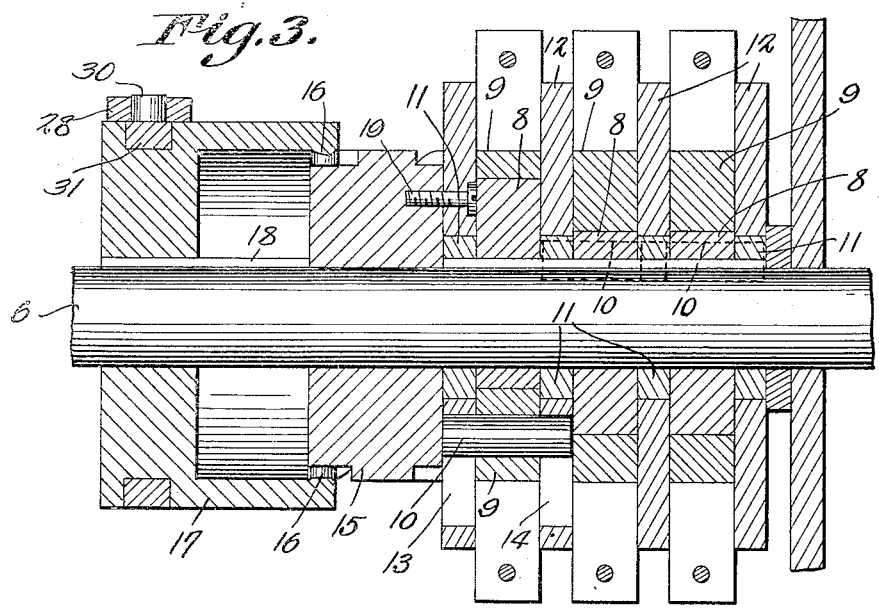
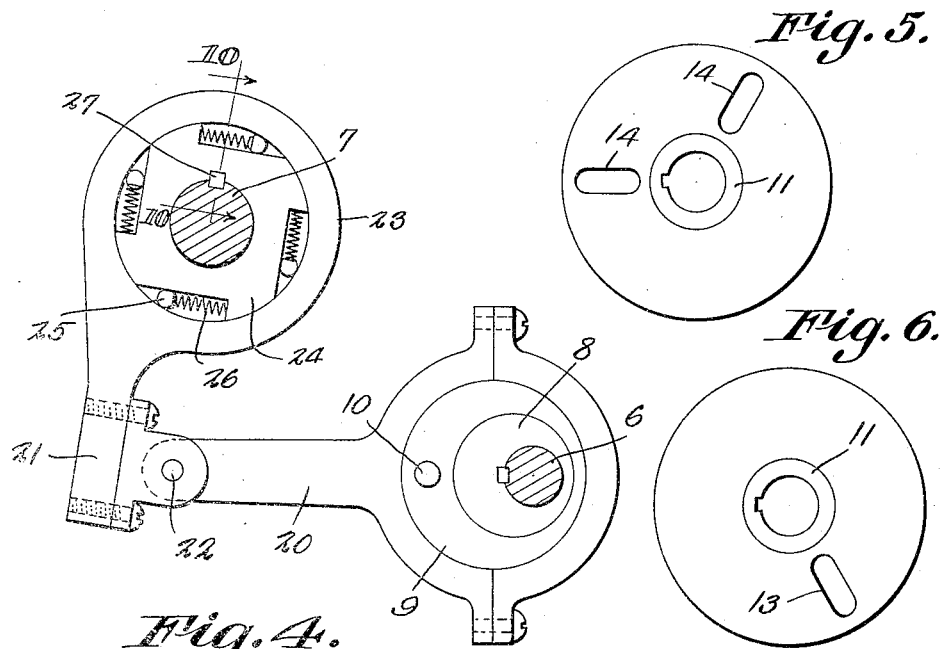
Inventor
Jesse M. Baum
By C. A. Snow & Co.
Attorneys.

Feb. 14, 1933.   J. M. BAUM   1,897,416
AUTOMATIC VARIABLE SPEED DRIVE
Filed Oct. 12, 1931   3 Sheets-Sheet 3
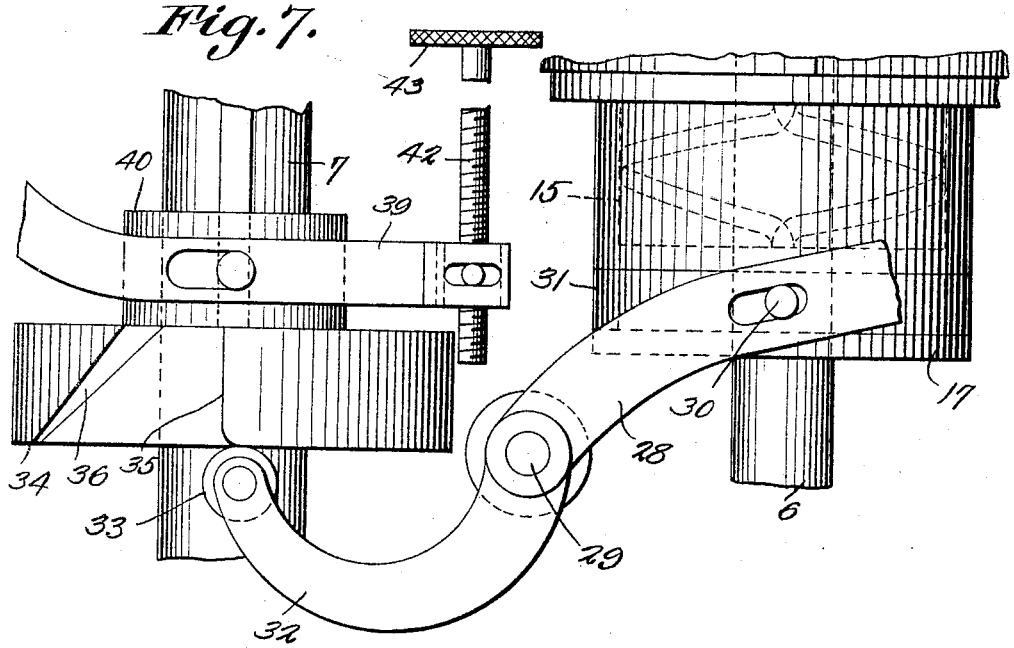
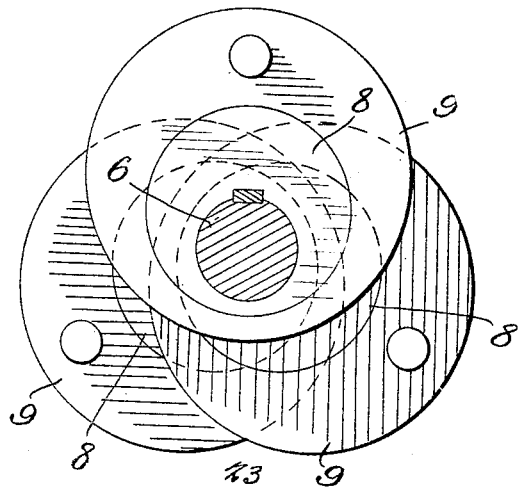
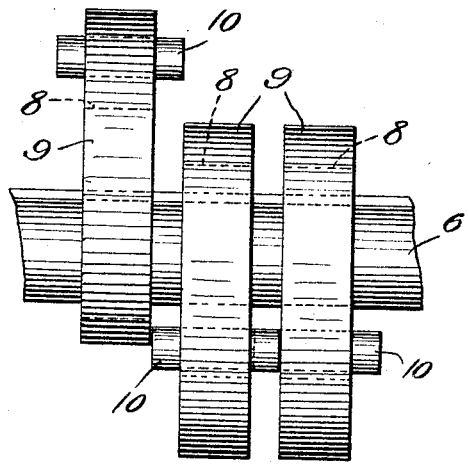
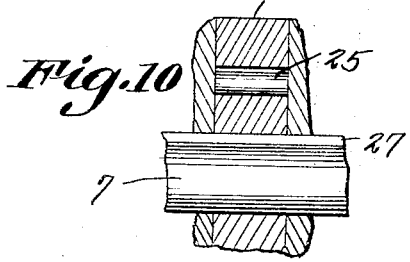
Inventor
Jesse M. Baum
By C. A. Snow & Co.
Attorneys.

Patented Feb. 14, 1933

1,897,416

UNITED STATES PATENT OFFICE

JESSE M. BAUM, OF WARREN, OHIO, ASSIGNOR OF ONE-FOURTH TO JESSE J. BAUM, OF CANTON, OHIO

AUTOMATIC VARIABLE SPEED DRIVE

Application filed October 12, 1931. Serial No. 568,417.

The present invention has reference to a variable speed mechanism designed for use in obtaining various speed ratios between a drive member and a driven member.

An important object of the invention is to provide a mechanism of this character including a plurality of rods having eccentric connection with the drive shaft, and a ratchet connection with the driven shaft to transmit rotary movement of the drive shaft to the driven shaft.

Another object of the invention is to provide means for intermittently throwing the mechanism into and out of operation, thereby providing a variable speed mechanism adapted for use in connection with various types of machinery such as machines for stamping sheet metal, pressing machines or the like.

A still further object of the invention is to provide a transmission constructed in such a way that the operation of the mechanism will be continuous, thereby adapting the device for use in propelling motor vehicles, or other similar continuously operating machinery.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a longitudinal sectional view taken on line 3—3 of Figure 1.

Figure 4 is an elevational view illustrating the construction of the eccentrics and clutch mechanism.

Figure 5 is an elevational view of one of the inner disks forming a part of the mechanism.

Figure 6 is an elevational view of an outer disk of the mechanism.

Figure 7 is an enlarged detail view showing the device in its active position.

Figure 8 is an elevational view illustrating the location of the eccentrics with respect to each other.

Figure 9 is an elevational view of the shaft and cams mounted thereon, the disks between the cams having been omitted.

Figure 10 is a fragmental sectional view taken on line 10—10 of Figure 4.

Figure 1:
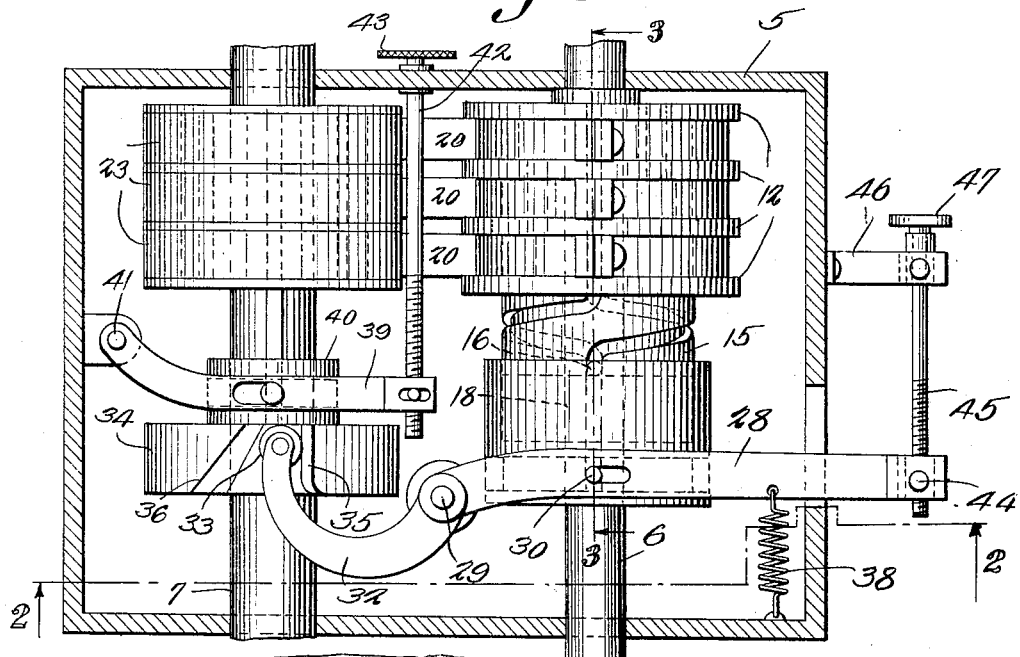
Figure 1 is a sectional view through the housing of the mechanism.
Figure 2:
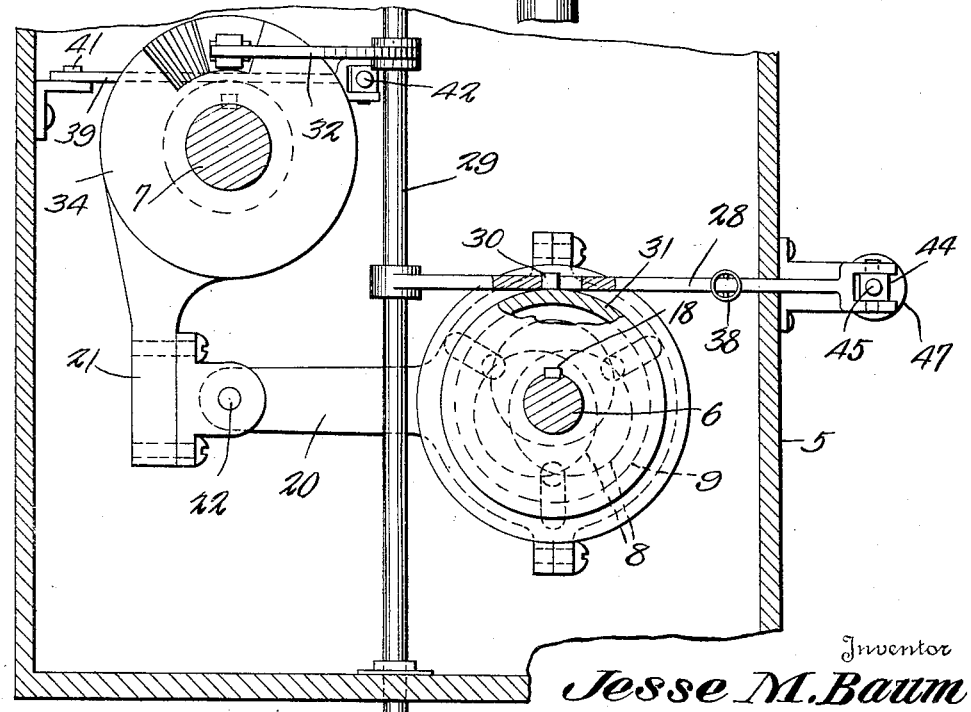
Figure 2 is a sectional view taken on line 2—2 of Figure 1.

Referring to the drawings in detail, the reference character 5 designates a housing which is formed with openings through which the shafts 6 and 7 respectively extend, the shaft 6 being the drive shaft, while the shaft 7 constitutes the driven shaft.

Keyed to the shaft 6, are a plurality of inner eccentrics 8 which are arranged at 120 degrees with respect to each other.

Mounted on the inner eccentrics are outer eccentrics 9, each of which eccentrics is provided with an opening, for the reception of a connecting pin 10, to be hereinafter more fully described.

Disposed between the eccentrics, and keyed to the shaft 6, are bearing members 11, which bearing members provide bearings for the spacing disks 12, and at the same time act to space the inner eccentrics 8 to the end that the inner eccentrics are held in proper operating position at all times.

As clearly shown by Figure 3 of the drawings, the innermost spacing disk is provided with an elongated opening 13, while the inner spacing disks are provided with elongated openings 14, the openings 13 and 14 being designed to accommodate the pins 10 that are carried by the outer eccentrics 9, and by connecting the eccentrics 9 to the spacing disks 12 in a manner to permit of rotary movement of the eccentrics with respect to the disks, for purposes to be hereinafter more fully described.

By referring to the Figure 9 of the drawings, it will be seen that due to this construction rotary movement of one spacing disk or one outer eccentric, will result in a relative movement of the remaining eccentrics.

The reference character 15 designates an adjusting member which is mounted for rotary movement on the shaft 6, the outer surface of the adjusting member 15 being provided with spirally formed slots in opposite sides thereof, which slots accommodate the pins 16, which are carried by the sleeve 17 that in turn is splined on the shaft 6, as clearly shown by Figure 3 of the drawings.

The key 18 which provides the connection between the shaft 6 and sleeve 17, also provides a stop for one end of the adjusting member 15, to insure against movement of the adjusting member 15, longitudinally of the shaft 6.

Connection is made between the adjusting member 15 and the spacing disk 12 adjacent thereto, by means of the bolts 19, which are threaded, and which extend into threaded openings of the adjusting member 15. It follows that upon movement of the sleeve 17 longitudinally of the shaft 6, rotary movement will be imparted to the adjusting member 15, with the result that rotary movement is also transmitted to the spacing disks and outer eccentrics to change the positions of the outer eccentrics with respect to the inner eccentrics and consequently adjusting the throw of the outer eccentrics.

Connecting rods 20 have connection with the eccentrics 9, in a manner as shown by Figure 4 of the drawings with the result that as the eccentrics are rotated, a reciprocatory movement is imparted to the connecting rods 20.

These connecting rods 20 have pivotal connection with the arms 21, through the pins 22, the arms 21 being formed integral with the clutch bands 23 that house the clutch blocks 24, the clutch blocks 24 being provided with cut out portions to accommodate the clutch rollers 25, that are urged to their active positions, by means of the coiled springs 26.

The clutch blocks 24 are keyed to the driven shaft 7, by means of the key 27, so that the blocks 24 rotate with the shaft 7. Thus it will be obvious that due to this construction, as the connecting rods 20 are oscillated, the arms 21 are rocked causing the clutch rollers 25 to wedge between the clutch blocks 24 and clutch bands 23, moving the clutch blocks 24 and shaft 7. As the arms 21 move forwardly, the rollers 25 are released, permitting the clutch bands 23 to move over the clutch blocks 24.

The reference character 28 designates the control arm, which is pivotally mounted on the shaft 29, the arm 28 having an elongated opening to accommodate the pin 30, which pin extends from the band 31, that is mounted in a groove formed in the sleeve 17. The opposite end of the control arm 28 is curved as at 32, and carries a roller 33 at its free end, the roller 33 operating over the controlled disk 34, which is provided with a cut out portion defining a straight wall 35 and an inclined wall 36.

When the control arm is in a position as shown by Figure 1 of the drawings, the sleeve 17 is moved to a position to cause the eccentrics 9 to assume positions concentric with the shaft 6, to the end that the shaft, together with the elements which are connected thereto, will rotate within the heads of the connecting arms 20 and will not move the connecting rods to transmit movement to the driven shaft.

In order to move the sleeve to a position to change the positions of the eccentrics 9 with respect to the shaft 6, the sleeve 17 is moved inwardly to a position as shown by Figure 7 of the drawings. This movement is accomplished by the operation of the shaft 29, the shaft 29 being provided with a pedal 37 at one end thereof, which is depressed by the operator, moving the arm 28 to its active position.

When the device is used for intermittently operating a driven shaft, a coiled spring such as indicated at 38, is connected with the arm 28 and normally acts to move the arm to a position as shown by Figure 1.

Thus it will be seen that when the shaft 7 makes one complete revolution, the curved end of the arm 32 will snap into the cut out portion of the control disk 34, moving the sleeve 17 to its outermost position, which movement rotates the adjusting member 15 to move the eccentrics 9 to their inactive positions.

The control disk 34 is adjustable longitudinally of the shaft 7, by means of the arm 39, which is connected with the sleeve 40 extending from the disk 34, the arm 39 being pivotally connected with the housing, at 41.

The outer end of the arm 39 is formed with an opening to receive the threaded end of the shaft 42, which is formed with a knurled head 43 whereby the shaft 42 may be rotated to move the sleeve 40 and control disk 34 as described.

It will of course be obvious that upon adjustment of the shaft 42, the disk 34 may be moved to a position spaced from the roller 33, thereby allowing the continuous operation of the device.

One end of the arm 28 extends through an opening in one end of the housing 5, where it is provided with an opening to receive the pivoted bearing member 44, which is provided with a threaded opening to receive the threaded end of the shaft 45, the upper end of the shaft operating through an opening formed in the arm 46, that extends laterally from the end wall of the housing.

This shaft 45 is formed with a head 47, by means of which the shaft 45 may be rotated. By adjusting the shaft 45, the initial position of the sleeve 17 may be varied, to normally hold the eccentrics 9 in such position with respect to the drive shaft as to vary the speed of operation of the mechanism. It is thought that in view of the foregoing disclosure, a further detail disclosure as to the operation of the device is unnecessary.

Having thus described the invention what is claimed is:

I claim:

1. In a device of the character described, a drive shaft and a driven shaft, inner eccentrics mounted on the drive shaft, outer eccentrics surrounding the inner eccentrics, means for transmitting movement of the outer eccentrics to the driven shaft, an adjustable control disk mounted on the driven shaft and having a cut out portion, a control arm having one end thereof engaging the control disk and adapted to move into the cut out portion to operate the control arm, and means operated by the control arm for moving the outer eccentrics to their inactive positions.

2. In a device of the character described, a drive shaft and a driven shaft, eccentrics mounted on the drive shaft and operated by the drive shaft, means for transmitting movement of the eccentrics to the driven shaft, a control disk mounted on the driven shaft, means for adjusting the control disk longitudinally of the driven shaft, an arm engaging the control disk and operated by the control disk, and means operated by the arm for moving the eccentrics to their inactive positions.

3. In a device of the character described, a drive shaft and a driven shaft, eccentrics rotated by the drive shaft, means for transmitting movement of the eccentrics to the driven shaft, a control disk mounted for movement longitudinally of the driven shaft and having a cut out portion, a pivoted control arm having a curved end contacting with the control disk and adapted to move into the cut out portion of the control disk to operate the control arm, and means operated by the control arm for adusting the eccentrics on the drive shaft to change the speed of operation of the driven shaft.

JESSE M. BAUM.